United States Patent [19]

Le Salver et al.

[11] Patent Number: 4,632,211

[45] Date of Patent: Dec. 30, 1986

[54] ANTI-TILT DEVICE FOR A MOTOR-DRIVE UNIT OF A MOTOR VEHICLE

[75] Inventors: Robert Le Salver, Chanteloup les Vignes; Dominique Poupard, Chaville, both of France

[73] Assignees: Automobiles Peugeot, Paris; Automobiles Citroen, Neuilly-sur-Seine, both of France

[21] Appl. No.: 544,714

[22] Filed: Oct. 24, 1983

[30] Foreign Application Priority Data

Oct. 27, 1982 [FR] France ................................ 82 17988
Apr. 1, 1983 [FR] France ................................ 83 05455

[51] Int. Cl.4 ............................................ B62D 21/00
[52] U.S. Cl. ................................ 180/312; 267/140.3; 248/621; 248/638
[58] Field of Search ............... 180/293, 297, 300, 312; 248/621, 634, 635, 638, 659; 267/140.3, 136

[56] References Cited

U.S. PATENT DOCUMENTS

| 1,912,451 | 6/1933 | Hibbard | 248/638 |
| 1,941,763 | 1/1934 | Swennes | 248/14.2 |
| 2,648,510 | 8/1953 | Henshaw | 248/8 |
| 3,270,998 | 9/1966 | Keetch | 267/140.3 |
| 4,440,257 | 4/1984 | Danckert | 180/300 |

FOREIGN PATENT DOCUMENTS

| 0038547 | 10/1981 | European Pat. Off. . |
| 0979048 | 4/1951 | France . |
| 1158530 | 6/1958 | France . |
| 2089650 | 7/1972 | France . |
| 2322304 | 8/1972 | France . |
| 2363033 | 8/1977 | France . |
| 178298 | 7/1935 | Switzerland . |
| 0617552 | 2/1949 | United Kingdom . |
| 0777226 | 6/1957 | United Kingdom . |

OTHER PUBLICATIONS

Patent Abstracts of Japan, vol. 6, No. 29, Feb. 20, 1982, p. M-113-907.

Primary Examiner—John J. Love
Assistant Examiner—Richard Camby
Attorney, Agent, or Firm—Burns, Doane, Swecker & Mathis

[57] ABSTRACT

The device is for a motor-drive unit 1 suspended elastically on the structure 5 of a vehicle. The device comprises reverse speed and forward speed abutments 11, 12 of low flexibility which are each interposed between two bearing elements of which one is connected to the support 6 of the unit 1 and the other is connected to a support 16 which is part of the structure 5. One, 18, of the bearing elements of at least one, 12, of the abutments is mounted to be movable relative to its support 16 and is maintained spaced from the latter by a predetermined distance J in a direction perpendicular to the axis of rotation of the unit 1, by means of a highly flexible pre-stressed spring 20. By means of this arrangement, when the gearbox is engaged with a front speed ratio and the vehicle remains stationary, the transmission to the structure 5 of the vibrations of the unit 1 through the forward speed abutment 12 is prevented.

7 Claims, 5 Drawing Figures

ANTI-TILT DEVICE FOR A MOTOR-DRIVE UNIT OF A MOTOR VEHICLE

DESCRIPTION

The present invention relates to an anti-tilt device for a motor-drive unit of a motor vehicle which is elastically suspended on the structure of the vehicle.

As is known, this type of device comprises an abutment of low flexibility interposed, with a small spacing in a direction perpendicular to the axis of rotation of the motor-drive unit, between support elements connected to the unit and to the structure respectively.

The invention is more particularly applicable to a motor-drive unit including a hydrokinetic coupling, a gearbox and an output shaft whose axis is parallel to the axis of rotation of the motor.

The elastic suspension of a motor-drive unit on the structure of a motor vehicle usually comprises, in addition to supports receiving the static load of this unit, a device having one or more abutments which limits its tilting about an axis parallel to its output shaft. This tilting tends to occur in one direction or the other according to whether the torque exerted by the unit on the output shaft is in the direction corresponding to forward travel or to rearward travel of the vehicle. This is why the anti-tilt device has at least one forward travel abutment and a rearward travel abutment.

When the output shaft is coaxial with or parallel to the axis of rotation of the motor, in particular the axis of the crankshaft in the case of an internal combustion motor having pistons, the possible angular vibrations of the motor about its axis are liable to be transmitted to the structure of the vehicle through these abutments. In order to avoid this drawback, which in practice is only noticeable when the motor is running at idling speed, it is conventional to slightly space each of these abutments from one of the bearing elements respectively connected to the unit and to the structure and between which the abutment is interposed. In this way, when no torque is transmitted by the unit to the output shaft, in particular because the gearbox is in the "neutral" position or because a device included in the unit is uncoupled, the small angular oscillations of the unit due to the vibrations of the motor occur without intervention of the abutments and consequently without transmission of the vibrations to the structure.

However, when the coupling device is of the hydrokinetic type, a certain drag torque is transmitted permanently from the motor to the gearbox. Thus, when the vehicle is stationary and the motor is running at idling speed and is consequently capable of vibrating, and the gearbox is engaged on a forward or reverse speed ratio, as is the case frequently when the vehicle travels in a town, the drag torque tends to tilt the unit in one direction and results in contact with the corresponding abutment. The latter then transmits to the structure the vibrations of the motor with insufficient filtering since it has low flexibility in order to be capable of effectively opposing the tilting of the unit when the motor is under high loads.

In French patent application No. 2 487 740 it has already been proposed, in order to solve this problem, to associate with the normal anti-tilt abutment an auxiliary abutment of high flexibility comprising an extensible chamber connected to a source of fluid under pressure, at least when the motor is idling with a speed ratio engaged in the gearbox.

An object of the invention is to obtain the same result by simpler and consequently cheaper means by avoiding in particular the use of a fluid under pressure.

The invention provides an anti-tilt device which comprises reverse speed and forward speed abutments of low flexibility interposed in a direction perpendicular to the axis of rotation of the unit, each between two bearing elements, one of which is connected to a support which is part of the motor-drive unit whereas the other is connected to a support which is part of the structure.

According to the invention, one of the bearing elements of at least one of the abutments is mounted to be movable relative to its support and maintained spaced from the latter a given distance in a direction perpendicular to the axis of rotation of the unit by means of a pre-stressed elastically yieldable means of a high flexibility having one end connected to the support relative to which said bearing element is movably mounted.

Consequently, if the bearing element of the forward speed abutment is movable relative to its support and maintained spaced from the latter by the pre-stressed elastically yieldable means and the gear box is engaged on a forward speed ratio, the pre-stressed elastically yieldable means exerts on the abutment a force opposing the force resulting from the tilting of the motor-drive unit, this opposing force being slightly less than the force supported by the abutment so that said distance or spacing is not taken up. Under these conditions, the vibrations of the unit are filtered by the highly flexible elastically yieldable means and are therefore not transmitted to the structure of the vehicle.

According to one embodiment of the invention, in which the motor-drive unit is suspended on a support which bears against an elastically yieldable block of high flexiblity supported by the structure, one of the abutments, for example the forward speed abutment, is fixed to a bearing element connected to a screw extending through the support and elastically biased in the direction toward the opposite bearing element of the abutment by a pre-stressed spring constituting said elastically yieldable means, for example a spring strip, one end of which is fixed to the structure and normally tends to maintain the bearing element spaced from the support by a distance equal to the aforementioned distance.

Thus, when the gearbox is engaged on a forward speed ratio and consequently the support of the motor drive unit tilts and exerts a force on the abutment, the latter moves closer to its support which is part of the structure so that the spacing decreases but is not eliminated so long as the vehicle is stationary. The elastically yieldable strip constituting the pre-stressed spring indeed opposes the contact of the abutment against its support.

According to a feature of the invention, elastically yieldable studs are fixed to the side of the bearing element of the abutment facing toward the support with, between these studs and said means, the aforementioned distance or spacing and a nut and an elastically yieldable member such as a washer are interposed between the spring and the support so that the nut remains applied against the washer by the pre-stressed spring so long as the tilting force supported by the abutment is less than the opposing force of the prestressing of the spring.

When the torques exerted on the abutment by the tilting of the motor-drive unit become greater in the course of the travel of the vehicle, the elastically yieldable studs then bear against the support of the abutment, which stops the tilting of the motor-drive unit in the conventional manner.

In an advantageous embodiment, the pre-stressed highly flexible elastically yieldable means is a spring strip bent into the shape of a hairpin one branch of which is fixed to one of the supports while the other branch constitutes a bearing element of one of the abutments, for example the forward speed abutment, and a spacer element ensures that the two branches of the spring are moved toward each other so as to produce the pre-stressing, said bearing element being maintained at a predetermined distance from its support.

Preferably, the support on which the spring is fixed is the support which is part of the motor-drive unit.

Further features and advantages of the invention will be apparent from the following description with reference to the accompanyings which illustrate two embodiments to which the scope of the invention is not intended to be limited.

FIG. 3 is a diagram illustrating the operation of the anti-tilt device.

Figure 1:
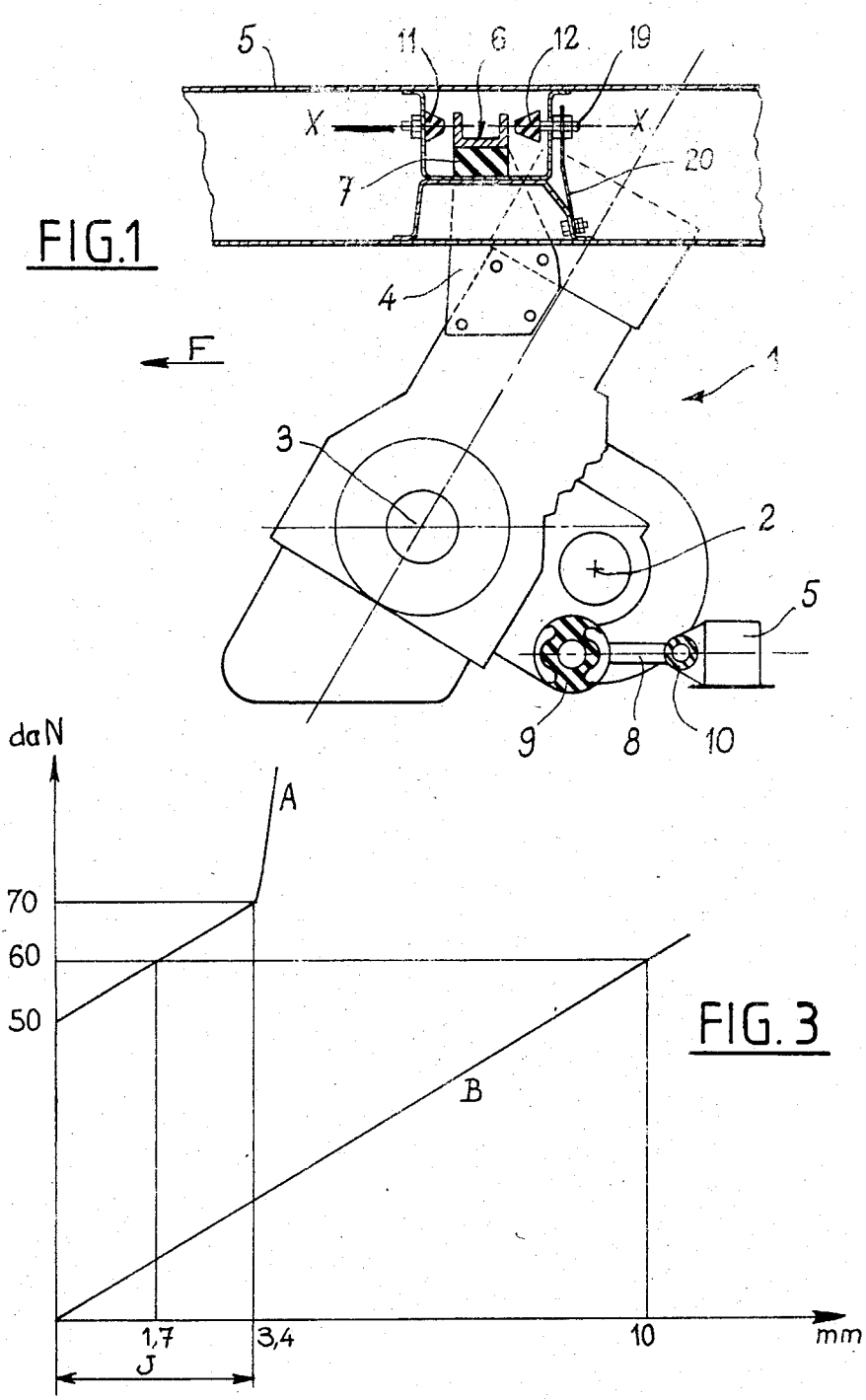
FIG. 1 is a digrammatic side elevational view of a motor-drive unit provided with an anti-tilt device according to the invention.
Figure 2:
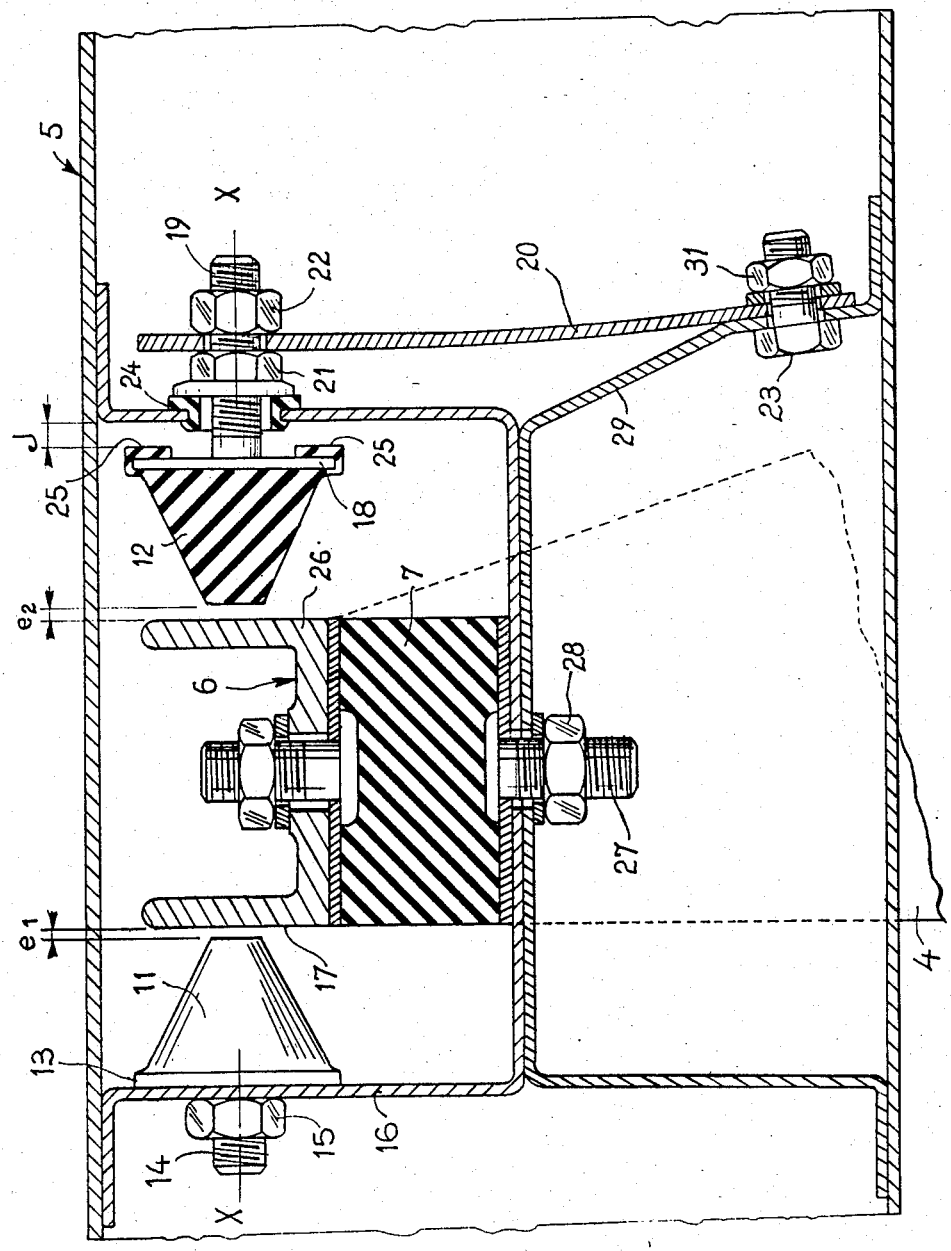
FIG. 2 is half-sectional, half-elevational view to an enlarged scale of the anti-tilt device shown in FIG. 1.

FIG. 1 shows diagrammatically a motor-drive unit 1 including an internal combustion piston motor connected by a hydrokinetic coupling device, such as a torque converter, to an automatic gearbox whose output shaft 2 is substantially parallel to the axis of rotation 3 of the crankshaft of the motor.

This motor-drive unit may be in particular a Diesel motor of a front-drive vehicle, this unit being mounted transversely of the direction of travel F of the vehicle.

A bracket 4 fixed to the upper part of the motordrive unit 1 transmits the static load of the latter to the structure 5 of the vehicle through a support 6 and an elastically yieldable block 7 of high flexibility in a horizontal direction orthogonal to the axis 3. The block 7 bears against the bottom of a support 16 which is part of the structure 5, to which support it is secured by screwthreaded studs and nuts, such as the stud 27 and the nut 28. The lower part of the unit 1 is connected to the structure 5 in the known manner by a link 8 and two elastically yieldable articulations 9 and 10.

Disposed on each side of the support 6 in a horizontal direction X—X orthogonal to the axis 3 are two anti-tilt abutments, namely an abutment 11 for the reverse speed and an abutment 12 for the forward speed.

The abutment 11 is fixed in a conventional manner to a bearing element 13 rigid with a screw 14 whereby it can be secured by means of a nut 15 to the support 16 which is part of the structure 5. The abutment 11 is disposed at a short distance $e_1$ from a bearing element 17 belonging to the support 6.

The forward speed abutment 12 is fixed to a bearing element 18 which is rigid with a screw 19 extending through the support 16 and a pre-stressed elastically yieldable means constituted in the presently-described embodiment by a spring strip 20 to which it is fixed between two nuts 21 and 22. The spring 20 is secured by its end opposed to the screw 19 to a part 29 of the structure 5 by a system comprising a bolt 23 and a nut 31. The spring 20 has high flexibility and is mounted in the pre-stressed condition so as to bias the nut 21 against an elastically yieldable washer 24 which is fixed to the support 16 and is coaxial with the screw 19.

Further, elastically yieldable studs 25 are secured to the side of the bearing element 18 of the abutment 12 facing the support 16 so as to leave between these studs 25 and the support 16 a clearance or spacing J, measured in the direction X—X, so long as the nut 21 remains applied against the washer 24 by the spring 20. A clearance or spacing $e_2$ exists between the abutment 12 and a bearing element 26 belonging to the support 6.

Thus, in this embodiment of the anti-tilt device according to the invention, the bearing element 18 of the forward speed abutment 12 is mounted to be movable relative to its support 16 and is maintained spaced from the latter by the predetermined distance J in a direction perpendicular to the axis of rotation 3 of the unit 1 by means of the pre-stressed spring 20 having high flexibility.

The anti-tilt device just described operates in the following manner:

When the gearbox is in the "neutral" position, the motor-drive unit 1 transmits no torque to the output shaft 2. The latter therefore does not tend to tilt and the clearances $e_1$, $e_2$ allow it to freely oscillate with a very small amplitude without the bearing elements 17 or 26 coming into contact with the abutments 11 or 12 respectively. In this way, the vibrations of the motor which are suitably filtered by the supporting block 7, are not transmitted to the structure 5, in particular when the unit is running at idling speed.

When the gearbox is engaged in respect of a forward speed ratio, the hydraulic coupling permanently ensures the coupling by the slip of the fluid between the motor and the gearbox. The unit 1 therefore transmits to the output shaft 2, while the vehicle is stationary, a drag torque which tends to move the vehicle forwardly. By reaction, the unit 1 tends to tilt in the opposite direction and the bearing element 26 bears against the abutment 12.

As the pre-stressed force exerted by the spring 20 is slightly less than the force supported by the abutment 12 under the foregoing conditions, the nut 21 is moved away from the washer 24 without however taking up the clearance J. The vibrations of the unit 1 are then filtered by the highly flexible spring 20.

For higher torques, encountered in the course of the travel of the vehicle, the studs 25 bear against the support 16 owing to the fact that the force exerted by the pre-stressed spring 20 becomes less than the force transmitted to the abutment 12 by the support 6. The abutment 12 then stops the tilting of the motor-drive 1 in the conventional manner.

The diagram of FIG. 3 illustrates this operation by means of a numerical example.

In this diagram, the curve A represents the law force/displacement along the axis X—X, the force being plotted as ordinates and the displacement in millimeters as abscissae. In its first part, corresponding to the taking up of the clearance J, namely 3.4 mm, the stiffness is very low; this stiffness is that of the spring 20, namely 6 daN/mm. When the clearance J has been taken up, the stiffness becomes very high since it is that of the abutment 12.

The force exerted by the pre-stressing of the spring 20 is 50 daN. As the motor runs at idling speed and a forward speed ratio is engaged in the gearbox, the force exerted by the motor-drive unit 1 on the abutment 12 is 60 daN. Under these conditions, it can be seen that the mean deflection in the region of the abutment 12 is about 1.7 mm. If it were desired, with a conventional elastically yieldable abutment, to obtain the same stiffness of 6 daN/mm for the same force of 60 daN, a deflection of 10 mm (curve B) would be obtained. This would then result in the following drawbacks:

disturbing longitudinal oscillations when reversing torque;
high stresses in the supporting block 7;
increased risk of contact between the motor-drive unit 1 and the structure 5.

Consequently, the anti-tilt device according to the invention provides an anti-tilt abutment which has high flexibility in the load zone corresponding to the drag torque at idling speed of the motor without the drawbacks of a large movement for this load.

Figure 4:
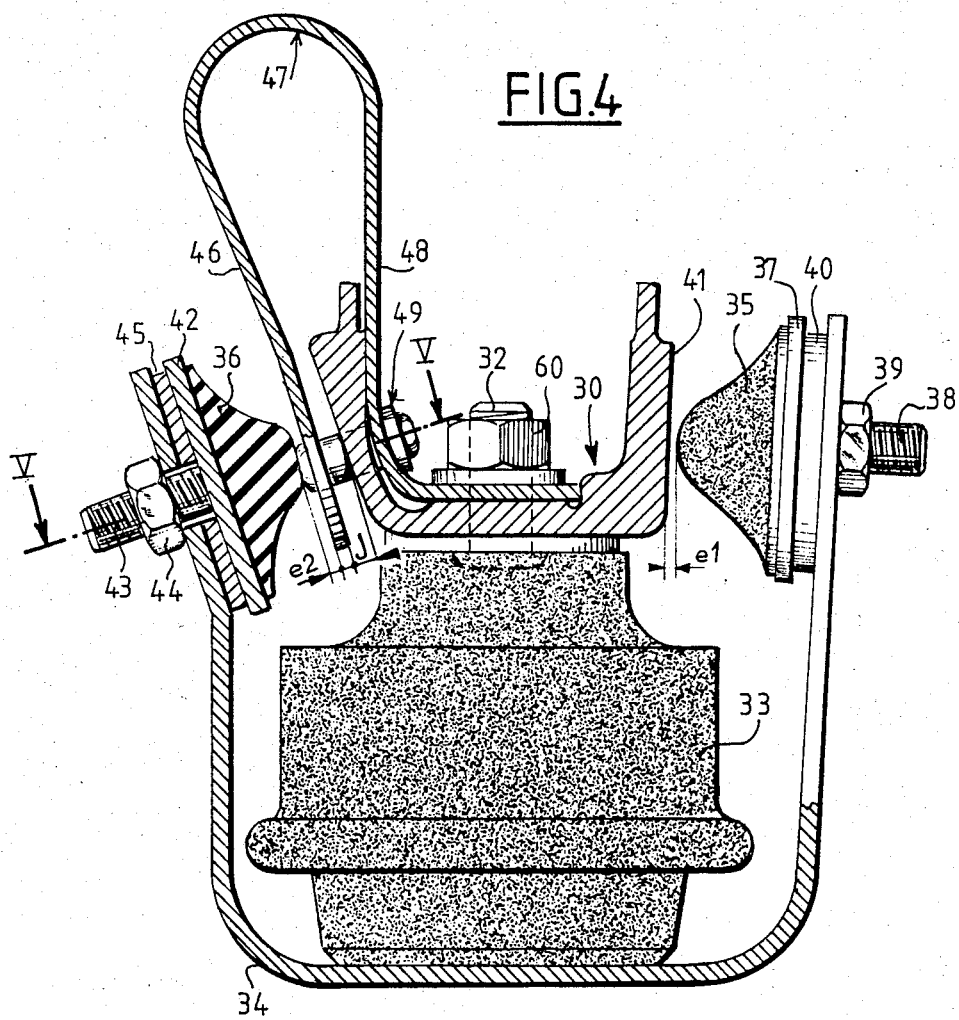
FIG. 4 is an elevational view, partly in section, of a second embodiment of the device according to the invention.
Figure 5:
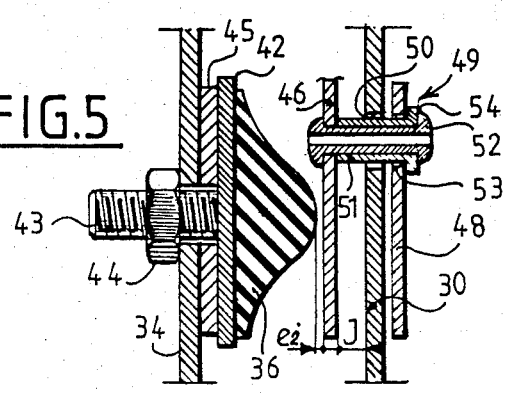
FIG. 5 is a sectional view taken along line V—V of FIG. 4.

The second embodiment illustrated in FIGS. 4 and 5 comprises a support 30 connected to a motor-drive unit (not shown) which is fixed by a nut 60 on a screw 32 rigid with an elastically yieldable block 33 which is secured in the conventional manner to a support 34 pertaining to the structure of the vehicle.

Disposed on each side of the support 20 are two anti-tilt abutments, namely an abutment 35 for the reverse speed and an abutment 36 for the forward speed.

The abutment 35 is secured in a conventional manner to a bearing element 37 which is rigid with a screw 38 whereby it can be fixed by means of a nut 39 to the support 34. An adjusting block or shim 40, interposed between the bearing element 37 and the support 34, enables the distance between the abutment 35 and a bearing element 41 pertaining to the support 30 to be adjusted to a predetermined value $e_1$.

In the same way, the forward speed abutment 36 is secured to a bearing element 42 which is rigid with a screw 4 whereby it can be fixed to the support 34 by a nut 44. An adjusting block or shim 45, interposed between the bearing element 42 and the support 34, enables the distance between the abutment 36 and a bearing element 46 to be adjusted to a predetermined value $e_2$. The bearing element 46 is constituted by a branch of a spring strip 47 bent into the shape of a hairpin. The second branch 48 of this spring strip is fixed to the support 30 by the nut 31.

The two branches 46, 48 of the spring strip 47 are interconnected by a spacer element 49 which extends freely through the support 30 in an aperture 50 (FIG. 5). The element 49 is shown in detail in FIG. 5 and comprises a sleeve 51 fixed to the branch 46 by a rivet 52. This sleeve freely extends through the branch 48 by way of an aperture 53 and has a stop shoulder 54 which is maintained in bearing relation to the branch 48 by the flexibility of the spring strip 47. In this position, a clearance or space J is provided between the branch 46, constituting a bearing element for the abutment 36, and the support 30.

The device just described operates in the same way as the preceding device.

It has the advantage of being simpler and consequently cheaper and of being more easily adaptable to various suspension configurations for motor-drive units.

The scope of the invention is not intended to be limited to the illustrated embodiments and modifications may be made and in particular the following:

The abutment 12 may be fixed either on the bearing element 18 connected to the structure or on the bearing element 26 connected to the motor-drive unit.

The bearing element which is movable relative to its support may be either the bearing element 18 connected to the structure 5 or the bearing element 26 connected to the motor-drive unit. In this case, the bearing element 26 is held spaced away by a predetermined distance J from the support 6 by a pre-stressed spring which has one end fixed to this support 6.

There may be adopted for the reverse speed abutment 11 the same device as that described hereinbefore for the forward speed- abutment 12.

The spring 20 may have any shape other than that illustrated, a spring strip such as that described having however the advantage of guiding the bearing element 18.

What is claimed is:

1. An anti-tilt device for a motor-drive unit which has an axis of rotation and pertains to a motor vehicle which has a structure, on which structure the unit is elastically suspended, said device comprising a forward speed abutment of low flexibility and a reverse speed abutment of low flexibility one of said abutments being fixed relative to said structure, each abutment being interposed, in a direction perpendicular to said axis of rotation, between two bearing elements one of which bearing elements is connected to a first support which is part of the motor-drive unit whereas the other bearing element is connected to a second support which is part of said structure, one of the bearing elements of at least one of the abutments being mounted to be movable relative to its support and being maintained spaced from its support by a predetermined distance in a direction perpendicular to said axis of rotation, by means of a pre-stressed elastically yieldable means of high flexibility having one end connected to the support relative to which said at least one bearing element is movably mounted, the highly flexible prestressed elastically yieldable means being operable when the device experiences displacements smaller than the predetermined distance, the low flexiblity abutment being operable when the device experience displacements greater than the predetermined distance.

2. An anti-tilt device for a motor-drive unit which has an axis of rotation and pertains to a motor vehicle has a structure, the unit being elastically suspended on the structure, said device comprising a forward speed abutment of low flexibility and a reverse speed abutment of low flexiblity each interposed, in a direction perpendicular to said axis of rotation, between two bearing elements one of which bearing elements is connected to a first support which is part of the motor-drive unit whereas the other bearing element is connected to a second support which is part of said structure, one of the bearing elements of at least one of the abutments being mounted to be movable relative to its support and being maintained spaced from its support by a predetermined distance in a direction perpendicular to said axis of rotation, by a pre-stressed elastically yieldable means of high flexibility having one end connected to the support to which said at least one bearing element is movably mounted, the motor-drive unit being suspended by a support which bears against a highly flexible elastically yieldable block supported by said structure, one of said abutments being rigidly fixed to a bearing element with a screw which extends through said second support and is elastically biased toward the opposite bearing element of said one abutment by a pre-stressed spring constituting said elastically yieldable means, the spring having one end which is fixed to said structure and being operative to maintain normally the bearing element spaced away from the support by a distance substantially equal to said predetermined distance.

3. A device according to claim 2, wherein elastically yieldable studs are fixed to a side of the bearing element of the abutment facing toward the support with said given distance between said studs and said support, and a nut is mounted on the screw and located between the spring and the support on which support is mounted an elastically yieldable washer so that the nut is applied against the support by the pre-stressed spring so long as the tilting force supported by the abutment is less than the force exerted by the pre-stressing of the spring.

4. A device according to claim 2, wherein said pre-stressed elastically yieldable means is a spring strip.

5. An anti-tilt device for a motor-drive unit which has an axis of rotation and pertains to a motor vehicle which has a structure, the unit being elastically suspended on the structure, said device comprising a forward speed abutment of low flexibility and a reverse speed abutment of low flexibility each interposed, in a direction perpendicular to said axis of rotation, between two bearing elements one of which bearing elements is connected to a first support which is part of the motor-drive unit whereas the other bearing element is connected to a second support which is part of said structure, one of the bearing elements of at least one of the abutments being mounted to be movable relative to its support and being maintained spaced from its support by a predetermined distance in a direction perpendicular to said axis of rotation, by a pre-stressed elastically yieldable means of high flexiblity having one end connected to the support to which said at least one bearing element is movably mounted, the pre-stressed elastically yieldable means of high flexibility being a spring strip which is bent into a hairpin shape and has one branch fixed to one of the supports and another branch which constitutes a bearing element of one of the abutments, and a spacer element for ensuring that the two branches of the spring are brought closer together so as to produce said pre-stressing, said at least one bearing element being maintained at said predetermined distance from its support.

6. A device according to claim 5, wherein the support on which the pre-stressed spring strip is fixed is that one of the supports which is connected to the motor-drive unit.

7. A device according to claim 5, wherein the spacer element comprises a sleeve which is fixed to the branch forming the bearing element of the associated abutment and freely extends through the other branch of the spring strip, said sleeve having a stop shoulder which bears against the other branch of the spring strip and is maintained in bearing relation to said other branch by the elastically yieldable pre-stressing of the spring strip.

* * * * *